(12) United States Patent
Benham et al.

(10) Patent No.: US 12,312,263 B2
(45) Date of Patent: May 27, 2025

(54) MULTIFUNCTION BYPASS DISPENSING SYSTEM

(71) Applicants: Roger Alan Benham, San Diego, CA (US); Daniel Owen Benham, San Diego, CA (US); Blaine Alan Benham, San Diego, CA (US)

(72) Inventors: Roger Alan Benham, San Diego, CA (US); Daniel Owen Benham, San Diego, CA (US); Blaine Alan Benham, San Diego, CA (US)

( * ) Notice: Subject to any disclaimer, the term of this patent is extended or adjusted under 35 U.S.C. 154(b) by 124 days.

(21) Appl. No.: 17/713,527

(22) Filed: Apr. 5, 2022

(65) Prior Publication Data

US 2022/0315461 A1 Oct. 6, 2022

Related U.S. Application Data

(60) Provisional application No. 63/170,984, filed on Apr. 5, 2021.

(51) Int. Cl.
*C02F 1/68* (2023.01)

(52) U.S. Cl.
CPC ........ *C02F 1/688* (2013.01); *C02F 2201/005* (2013.01); *C02F 2201/006* (2013.01)

(58) Field of Classification Search
CPC ............... C02F 1/688; C02F 2201/005; C02F 2201/006; C02F 2301/043
See application file for complete search history.

(56) References Cited

U.S. PATENT DOCUMENTS

| | | | |
|---|---|---|---|
| 1,988,000 A | 1/1935 | Estler | |
| 2,375,730 A * | 5/1945 | Paden | B01J 19/243 422/235 |
| 2,419,845 A | 4/1947 | Merrick | |
| 2,667,663 A | 2/1954 | Blasczyk | |
| 2,758,877 A | 8/1956 | Gleason | |
| 2,869,926 A * | 1/1959 | Bror | B01F 21/221 422/282 |
| 3,266,870 A | 8/1966 | Cianflone, Jr. | |
| 3,776,274 A | 12/1973 | Riley | |
| 3,876,544 A | 4/1975 | Fowler | |
| 4,063,663 A | 12/1977 | Larson et al. | |
| 4,691,732 A | 9/1987 | Johnson et al. | |
| 5,225,074 A | 7/1993 | Moini | |
| 5,507,945 A * | 4/1996 | Hansen | C02F 1/688 222/190 |
| 5,913,327 A | 6/1999 | Zhadanov et al. | |
| 5,976,385 A | 6/1999 | King | |
| 6,221,321 B1 | 4/2001 | Fleischer et al. | |
| 6,241,884 B1 * | 6/2001 | Hansen | B29C 39/02 137/268 |
| 6,358,425 B1 | 3/2002 | King | |
| 6,902,668 B2 | 6/2005 | Benham | |
| 2003/0042207 A1 * | 3/2003 | Kilawee | C02F 1/688 210/696 |
| 2019/0291029 A1 * | 9/2019 | MacDonald | B01D 29/56 |

* cited by examiner

*Primary Examiner* — Hayden Brewster
(74) *Attorney, Agent, or Firm* — Welsh Flaxman & Gitler LLC

(57) ABSTRACT

A multifunction dispenser system for the treatment of water systems is disclosed. The described invention includes the use of a multifunction bypass type dispenser system with integrated isolation valves, modifications to produce bypass flows proportional water flow rate, and a self-metering replaceable chemical cartridge.

26 Claims, 11 Drawing Sheets

MULTIFUNCTION BYPASS DISPENSING SYSTEM

REFERENCE TO RELATED APPLICATIONS

This application claims the benefit of U.S. Provisional Application 63/170,984, filed Apr. 5, 2021, entitled "MULTIFUNCTION BYPASS DISPENSING SYSTEM," which is incorporated herein by reference.

BACKGROUND OF THE INVENTION

Field of the Invention

The present invention relates to a chemical injection apparatus, in particular to a water treatment system with a dispenser, or chemical reservoir, for treating piping systems in buildings, where the chemical is injected into a water supply pipe by a pressure differential created by a venturi effect or resistance in series with the flow, which creates a proportional bypass flow through the dispenser. The dispenser includes a replaceable cartridge, where the cartridge can be replaced by isolating the water pressure to the dispenser by means of integrated valves.

Description of Related Art

Many commercial and residential water supplies suffer from objectionable conditions. Often, treatment measures are implemented with the addition of chemical treatments to the water supply, including for example phosphate or silicate compounds. In order to provide effective treatment and to prevent other problems from occurring, equipment associated with the addition of chemical treatments to the water supply must be reliably installed and requires regular maintenance, including the addition of consumable water treatment chemicals.

There are various methods presently available for the injection of chemicals into pressurized piping systems. For example, U.S. Pat. No. 3,266,870 to Cianflone discloses a dispenser for forming a saturated chemical solution in which fresh water entering a pot is uniformly distributed in a manner decreasing the time required to produce a uniform solution at the draw-off point. The dispenser improves circulation of water that tends to reduce undissolved solids dispersed in the saturated solution, thereby eliminating the need for screens in the outlet line from the feeder. The dispenser also provides improved uniformity in the saturated solution regardless of the level of the dry chemical, thereby providing a more precisely controllable system for chemically treating water.

The present applicant has also designed chemical dispensing system, for example, U.S. Pat. No. 6,902,668. This chemical dispensing system includes a dispenser head member and a chemical holding container for holding chemical. The dispenser head member has a flow entry means for directing fluid flow into the chemical holding container and a flow exit means for directing fluid flow out of the chemical holding container. The flow entry means is in fluid connection with a center-mounted, elongated perforated tubular member extending at least partway into the chemical holding container. The chemical holding container has an opening which is releasably engageable with the dispenser head member for refilling.

These various designs all have their benefits and shortcomings. The present invention is designed to provide additional options for injecting water treatment products into a water pipe, improve reliability, and provide safer treatment compared to other presently available alternatives, and is particularly important for the improvement in quality and cost benefits to the consumer.

SUMMARY

The present invention is directed to an improved chemical dispensing apparatus, which may at least partially overcome the disadvantages of existing systems or provide the consumer with a useful or commercial choice.

In a broad form, the invention resides in a chemical injection system that includes a tank and head assembly, where the tank and head assembly are joined with a removable clamp and seal to form a dispenser assembly that is capable of withstanding water pressures commonly used in modern building plumbing systems, where said tank accommodates a replaceable cartridge. The replaceable cartridge contains a consumable water treatment chemical. The cartridge has perforations in the body thereof that allow a metered rate of dissolution of the consumable water treatment chemical. The head assembly has integrated valves that allow for the water pressure to be isolated from the tank portion of the dispenser assembly, permitting the servicing and replacement of the replaceable cartridge without having to shut down the water pressure to the entire building. The head assembly includes a purge valve that allows for the depressurization of the tank during servicing and replacement of the replaceable cartridge, and for the purging of air from the tank after cartridge replacement. The head assembly has a central passage duct that can be configured for multiple water treatment applications including a built-in flow-through venturi, an injection-tube extension for direct attachment to a tee in the piping system, a remote venturi application, and a daisy chain series of dispensers to increase treatment capacity. The rate of chemical injection can be adjusted by use of integrated orifice jets, the configuration of the injection-tubes, or the adjustment of the exit ports on the replaceable cartridge.

In one aspect a multifunction dispensing apparatus includes a head assembly having a dispenser head, a first port, and a second port. The apparatus also includes a tank to which the head assembly is secured, and a replaceable chemical cartridge installed within the tank. The replaceable chemical cartridge is filled with a soluble chemical product and includes a cartridge inlet port, annulus space defined as a region between an internal upper surface of the replaceable chemical cartridge and a top of the soluble chemical product, and a series of cartridge outlet ports. In practice, cartridge flow, that is, flow of bypass water that is diverted into and through the replaceable chemical cartridge, enters via the first port, passing through an inlet channel of the first port, then into the cartridge inlet port. The cartridge flow then enters the cartridge space, the cartridge flow causing gradual dissolution of the soluble chemical product, forming a semi-saturated cartridge flow, which carries chemical product out the replaceable chemical cartridge through the series of cartridge outlet ports. After the semi-saturated cartridge flow exits the cartridge outlet ports, the flow continues up through the annulus space between the replaceable chemical cartridge and an outlet channel of the second port, then out toward the second port.

In some embodiments size, configuration, and placement of the cartridge outlet ports are configured to regulate the cartridge flow and produce a gradual dissolution of the soluble chemical product.

In some embodiments the head assembly also includes an integrated inlet ball valve and an integrated outlet ball valve, wherein the integrated inlet ball valve and the integrated outlet ball valve permit "on" and "off" regulation of flow and pressure into a dispenser tank In some embodiments a sealing gasket forms a pressure tight seal between the head assembly and the tank.

In some embodiments the replaceable chemical cartridge is comprised of a cylindrical or semi-cylindrical body.

In some embodiments a removable and/or adjustable venturi orifice is provided in the dispenser head.

In some embodiments an injection-tube includes flow modifiers that supplement a desired pressure drop between the first port and the second port caused by mainstream flow.

In some embodiments the cartridge outlet ports range from diameters of 1 mm to 10 mm.

In some embodiments a screen layer covers cartridge output ports.

In another aspect a multifunction dispensing apparatus includes a head assembly having a dispenser head, a first port, a second port, an integrated inlet ball valve, and an integrated outlet ball valve, wherein the integrated inlet ball valve and the integrated outlet ball valve permit "on" and "off" regulation of flow and pressure into a dispenser tank. The apparatus also includes a tank to which the head assembly is secured, and a replaceable chemical cartridge installed within the tank. The replaceable chemical cartridge is filled with a soluble chemical product.

In another aspect the multifunction dispensing apparatus includes a head assembly including a dispenser head, a first port, a second port, and a removable and/or adjustable mid-section. The apparatus also includes a tank to which the head assembly is secured, and a replaceable chemical cartridge installed within the tank, the replaceable chemical cartridge being filled with a soluble chemical product.

In a further aspect a multifunction dispensing apparatus includes a head assembly having a dispenser head, a first port, a second port, an integrated inlet ball valve, and an integrated outlet ball valve, wherein the integrated inlet ball valve and the integrated outlet ball valve permit "on" and "off" regulation of flow and pressure into a dispenser tank. The apparatus also includes a tank to which the head assembly is secured via a clamp assembly and a replaceable chemical cartridge installed within the tank, the replaceable chemical cartridge being filled with a solid soluble chemical product. The replaceable chemical cartridge includes a cartridge inlet port, a cartridge space defined as a region between an internal upper surface of the replaceable chemical cartridge and a top of the solid soluble chemical product, and a series of cartridge outlet ports. An injection-tube is provided to create a desired pressure drop between the first port and the second port caused by mainstream flow.

These and other objects of the present invention will be readily apparent upon review of the following detailed description of the invention and the accompanying drawings. These objects of the present invention are not exhaustive and are not to be construed as limiting the scope of the claimed invention. Further, it must be understood that no one embodiment of the present invention need include all of the aforementioned objects of the present invention. Rather, a given embodiment may include one or none of the aforementioned objects. Accordingly, these objects are not to be used to limit the scope of the claims of the present invention.

DETAILED DESCRIPTION

Figure 1A:
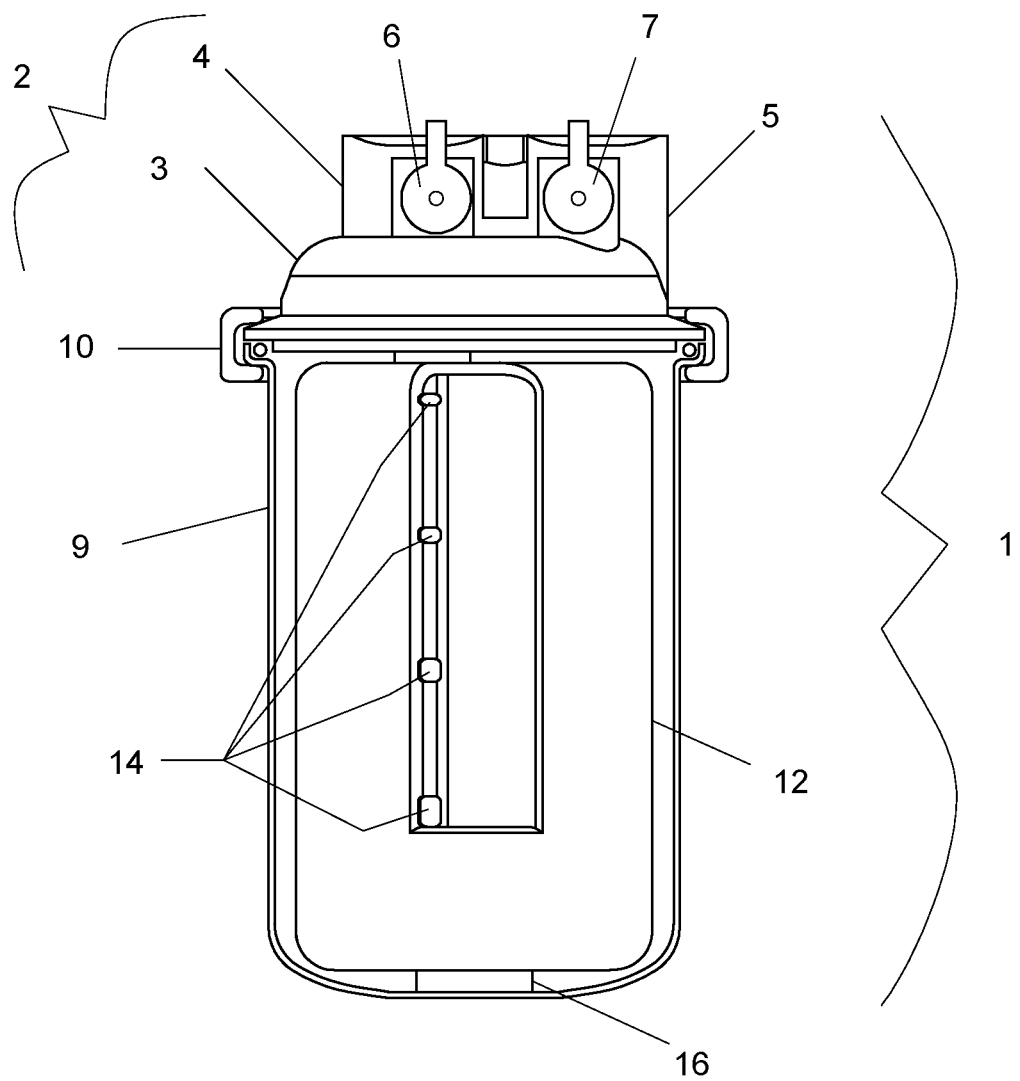
FIG. 1A shows a front view of the multifunctional dispensing apparatus assembly, including the head assembly that includes the integrated valves, the tank, and a portion of the clamp that joins the head assembly to the tank. The tank, or canister, portion of the assembly has been sectioned in half to reveal the internally installed replaceable chemical cartridge.

The detailed embodiments of the present invention are disclosed herein. It should be understood, however, that the disclosed embodiments are merely exemplary of the invention, which may be embodied in various forms. Therefore, the details disclosed herein are not to be interpreted as limiting, but merely as a basis for teaching one skilled in the art how to make and/or use the invention.

With reference to FIGS. 1 through 7, the multifunction dispensing apparatus and its preferred features and functions are illustrated. As will be appreciated, similar reference numerals are used in the various embodiments presented below.

As will be appreciated based upon the following detailed disclosure, the multifunction dispensing apparatus assembly 1 includes a head assembly 2 having a dispenser head 3, a left-hand first port 4, a right-hand second port 5, an integrated inlet ball valve 6, an integrated outlet ball valve 7, and a purge valve port 8. The integrated inlet ball valve 6 and the integrated outlet ball valve 7 permit "on" and "off" regulation of flow and pressure into a dispenser tank 9. The multifunction dispensing apparatus assembly 1 includes the dispenser tank 9 to which the head assembly 2 is secured via a clamp assembly and a replaceable chemical cartridge 12 installed within the dispenser tank 9, the replaceable chemical cartridge 12 being filled with a solid soluble chemical product. In practice, and in accordance with the embodiment disclosed with reference to FIG. 3, cartridge flow 18, that is, flow of bypass water that is diverted into and through the replaceable chemical cartridge 12, enters via the left-hand first port 4, passing through the inlet channel 19 and the integrated inlet ball valve 6, then into a cartridge inlet port 13, the cartridge flow 18 then enters a cartridge space defined as the region between an internal upper surface of the replaceable chemical cartridge 12 and a top of the solid soluble chemical product. The cartridge flow 18 causes gradual dissolution of the soluble solid chemical product, forming a semi-saturated cartridge flow, which carries chemical product out the replaceable chemical cartridge 12 through a series of cartridge outlet ports 14. After the semi-saturated cartridge flow exits the cartridge outlet ports 14, the flow continues up through the annulus space between the replaceable chemical cartridge 12 and the dispenser tank 9 toward the integrated outlet ball valve 7 and outlet channel 21, then out toward the right-hand second port 5.

Figure 1B:
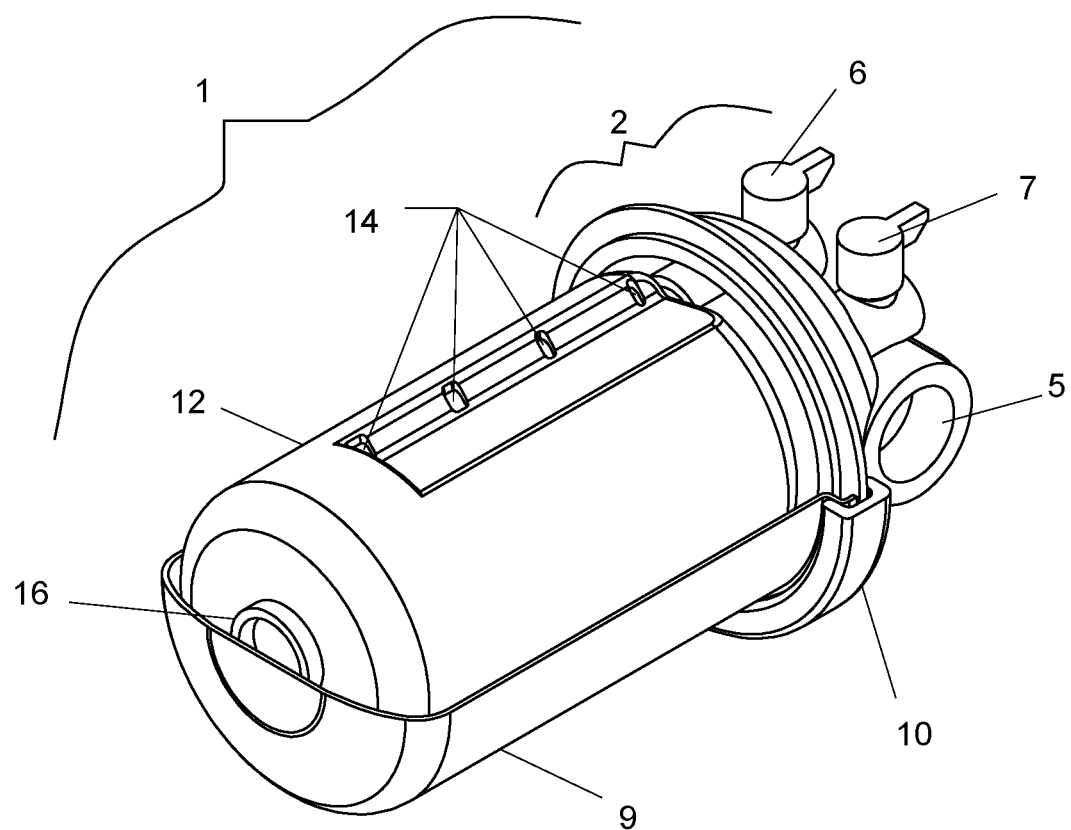
FIG. 1B provides an isometric view of the front right-hand side of the multifunctional dispensing apparatus assembly shown in FIG. 1A, showing the right-hand side main port.
Figure 1C:
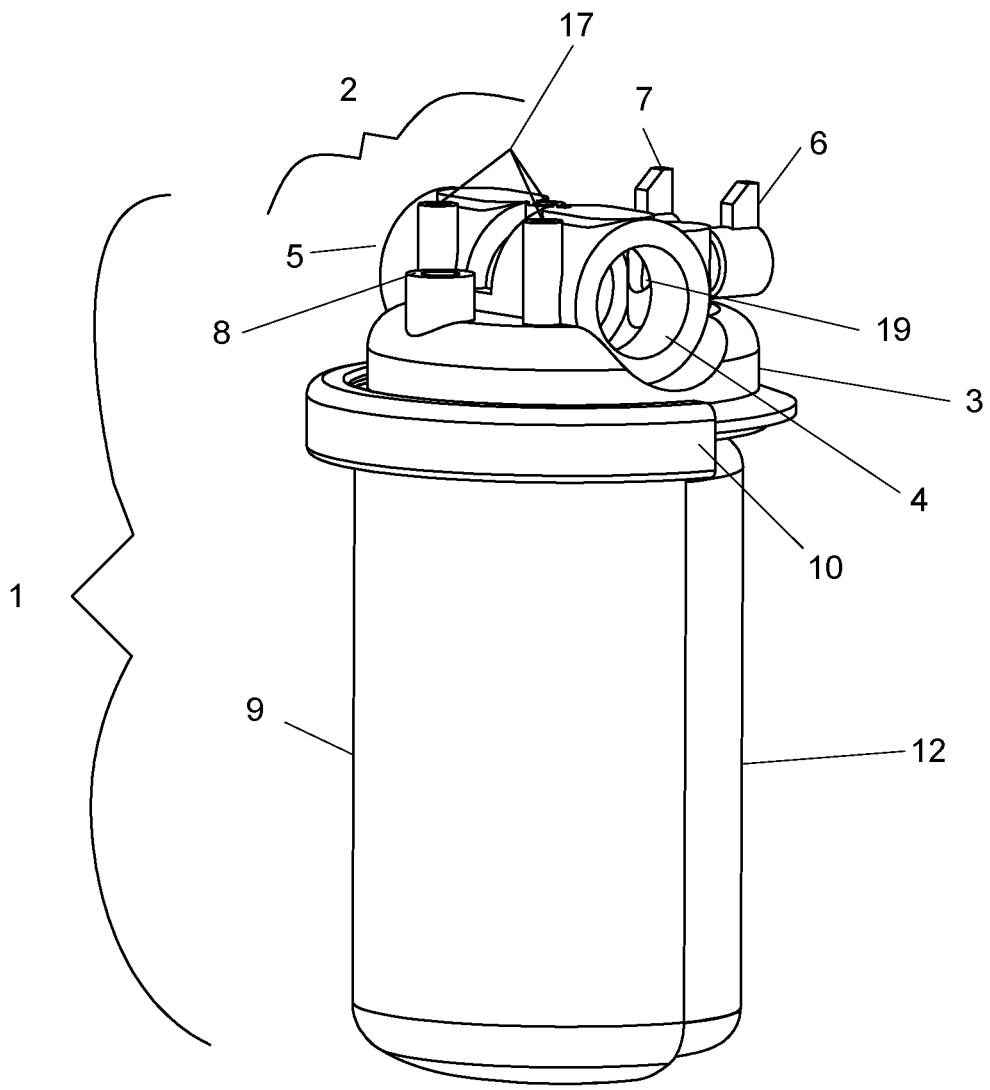
FIG. 1C provides an isometric view of the back left-hand side of the multifunctional dispensing apparatus assembly shown in FIG. 1A, showing the left-hand side main port and the purge valve port.

FIGS. 1A, 1B, and 1C respectively show a front view of the multifunctional dispensing apparatus assembly 1, an isometric view of the front right-hand side of the multifunctional dispensing apparatus assembly shown in FIG. 1A, and FIG. 1C provides an isometric view of the back left-hand side of the multifunctional dispensing apparatus assembly shown in FIG. 1A. As shown, the multifunctional dispensing apparatus assembly 1 includes a head assembly 2 that includes a dispenser head 3, a left-hand first port 4, and right-hand second port 5, an integrated inlet ball valve 6, an integrated outlet ball valve 7, and a purge valve port 8 (shown in FIG. 1C).

The head assembly 2 as shown in FIG. 1A is affixed to a dispenser tank 9 by a clamp assembly 10. The dispenser tank 9 illustration provided in FIG. 1A shows the tank to be sectioned in half and includes only the back half of the dispenser tank 9, to allow a view of the internal components. A sealing gasket 11 is positioned between the head assembly 2 and the dispenser tank 9 and used to form a pressure tight seal between the head assembly 2 and the dispenser tank 9. While a specific shape of the sealing gasket 11 is disclosed in accordance with the disclosed embodiment, the sealing gasket 11 could be of different shapes and materials, including a rubber ring, to optimize the sealing characteristics.

As best shown in FIG. 1A, a replaceable chemical cartridge 12 is installed within the dispenser tank 9. As will be appreciated based upon the following disclosure, the replaceable chemical cartridge 12 is filled with a soluble chemical product 12X (for example, a solid soluble chemical product). In the disclosed embodiment, the replaceable chemical cartridge 12 is comprised of a cylindrical or semi-cylindrical body comprising a cartridge inlet port 13 (shown in FIG. 2), a metering type of cartridge outlet port 14, an optional cartridge mounting tab 15 (shown in FIG. 2), and a cartridge mounting foot 16. It is noted that the metering type of outlet port associated with the replaceable chemical cartridge 12 is in the form of a series of openings specifically sized and positioned to allow an effective dissolution of the chemical product contained within the cartridge.

As mentioned above, FIG. 1B provides an isometric view of the front right-hand side of the multifunctional dispensing apparatus assembly shown in FIG. 1A, showing the right-hand second port 5. Similar to FIG. 1A, the dispenser tank 9 illustration provided in FIG. 1B shows the tank to be sectioned in half and includes only the back half of the dispenser tank 9, to allow a view of the internal components.

Further, FIG. 1C provides an isometric view of the back left-hand side of the multifunctional dispensing apparatus assembly shown in FIG. 1A, showing the view of the left-hand first port 4 and the purge valve port 8. Similar to FIG. 1A and FIG. 1B, the dispenser tank 9 illustration provided in FIG. 1C shows the tank to be sectioned in half and includes only the back half of the dispenser tank 9.

The purge valve port 8 allows for the release of pressure contained in the dispenser tank 9 during replacement of the replaceable chemical cartridge 12. The purge valve port 8 is positioned to provide an open channel to the atmosphere, to relieve pressure in the dispenser tank 9 while pressure is still maintained in the regions of the left-hand first port 4 and the right-hand second port 5, by placing the two integrated ball valves, namely, the integrated inlet ball valve 6, and the integrated outlet ball valve 7, in the off position.

Visible in the view provided in FIG. 1C is the inlet channel 19, defined as the passage through the integrated inlet ball valve 6. Not shown in the view provided by FIG. 1C is the outlet channel 21, defined as the passage through the integrated outlet ball valve 7, which is shown in two-dimensional fashion in FIG. 2.

Also shown in FIG. 1C are the mounting bracket posts 17 for affixing the multifunctional dispensing apparatus assembly 1 to a wall, post, or other fixed structure. The mounting brackets are not shown.

Figure 2:
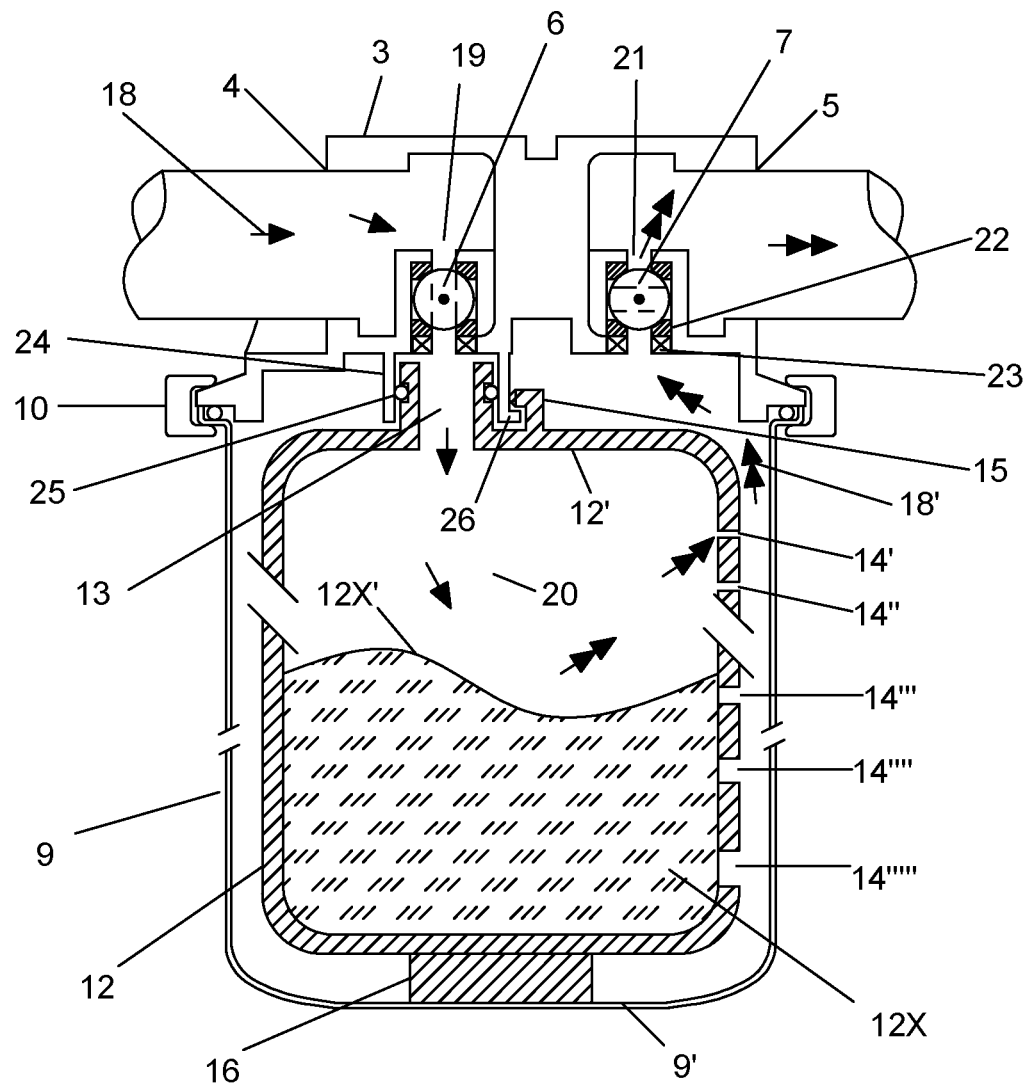
FIG. 2 shows a sectioned view showing the placement and operation of the integrated valves used to permit on-and-off flow and pressure in the tank, the mounting and sealing of replaceable chemical cartridge, and a general illustration of the water flow through the multifunctional dispensing apparatus.

FIG. 2 shows a sectioned view of the multifunctional dispensing apparatus used as a "bypass" type of water treatment dispenser showing the placement and operation of the integrated valves, including the integrated inlet ball valve 6 and the integrated outlet ball valve 7. As will be appreciated based upon the following disclosure, the purpose of the ball valves (that is, the integrated inlet ball valve 6 and the integrated outlet ball valve 7) is to permit the on and off regulation of flow and pressure into the dispenser tank 9.

Referring to the embodiment of the invention shown in FIG. 2, a cartridge flow 18, represented by the solid arrow, enters the multifunctional dispensing apparatus via the left-hand first port 4, which is defined as the flow of bypass water that is diverted into and through the replaceable chemical cartridge 12. For the purpose of clarification, it is emphasized that this embodiment is a "bypass" type of water treatment system, and unlike the "flow-through" type where the entire mainstream water flow (numbered 28 in FIGS. 4, 5, and 6) flows through the water treatment system and has contact with the chemical treatment product, with the "bypass" type of water treatment dispenser only a proportional portion (defined as "cartridge flow 18 in this invention) of the main water flow (numbered 28 in FIGS. 4, 5, and 6) is diverted through the dispensing apparatus assembly 1. The cartridge flow 18 then enters the inlet channel 19 and passes through the integrated inlet ball valve 6. The cartridge flow then flows into the cartridge inlet port 13. The cartridge flow 18 then enters the cartridge space 20. The cartridge space 20 is defined as the region between the internal upper surface 12' of the replaceable chemical cartridge 12 and the top 12X' of the solid soluble chemical product 12. The cartridge flow 18 causes gradual dissolution of the soluble solid chemical product 12X, forming a semi-saturated cartridge flow 18', represented by double solid arrows, which carries chemical product 12X out the replaceable chemical cartridge 12 through a series of cartridge outlet ports 14', 14", 14'", 14"", 14""". The size, configuration, and placement of the cartridge outlet ports 14', 14", 14'", 14"", 14""" is configured to regulate the cartridge flow 18 and produce a gradual dissolution of the soluble solid chemical product 12X, the function of which is described later in FIGS. 7A, B, and C, that includes information pertaining specifically to the replaceable chemical cartridge 12.

Referring back to the cartridge flow 18 shown in FIG. 2, after the semi-saturated cartridge flow 18' exits the cartridge outlet ports 14, the flow continues up through the annulus space between the replaceable chemical cartridge 12 and the dispenser tank 9 toward the integrated outlet ball valve 7 and outlet channel 21. The cartridge flow 18 then proceeds out the right-hand second port 5. It should be noted, in FIG. 2, for the purpose of illustrating the on-off feature of the integrated outlet ball valve 7, the integrated outlet ball valve 7 is shown rotated in the "off" position to prevent flow, compared to the integrated inlet ball valve 6 that is shown in the "on" position.

As shown in the embodiment of FIG. 2, both the integrated inlet ball valve 6 and outlet ball valves 7 can be configured in a manner typical for 2-way and 3-way ball valve design, including the use of ball valve sealing washer 22 and a ball valve lock nut 23. FIG. 2 shows the ball valve sealing washer 22 and ball valve lock nut 23 installed from the bottom, however, the valves could be configured in a varied manner, as is known in the valve manufacturing industry, including having the sealing washer 22 and lock nut 23 installed from the top using a type of threaded cap, including 2-way and 3-way ball valve operation.

Further shown in FIG. 2 is an embodiment of the junction between the dispenser head 3 and the replaceable chemical cartridge 12, including the cartridge inlet port 13 that directly communicates with the dispenser head receiving port 24. A cartridge inlet port sealing gasket 25 is ordinarily positioned between the cartridge inlet port 13 and the dispenser head receiving port 24 to produce an effective seal between the cartridge inlet port 13 and the dispenser head receiving port 24.

Further shown in FIG. 2 is a head cartridge receiving tab 26 at the base of the dispenser head receiving port 24. The head cartridge receiving tab 26 provides a means of holding the replaceable chemical cartridge 12 in position during replacement. In accordance with a disclosed embodiment, the owner-operator lines up the cartridge inlet port 13 directly with the dispenser head receiving port 24, then pushes until the replaceable cartridge mounting tab 15, snaps over the head cartridge receiving tab 26. It is contemplated this positive locking action could be configured to incorporate a twisting motion and a snapping mechanism (not shown in drawings) where a protrusion on the replaceable cartridge mounting tab snaps into a recess in the head cartridge receiving tab.

The use of the replaceable cartridge mounting tab 15 to hold the replaceable chemical cartridge 12 in place by snapping it over the head cartridge receiving tab 26 during replacement of the replaceable chemical cartridge 12 by the owner-operator, is primarily meant to serve that function during the replacement process. During normal operation, under full pressure and flow, there may be forces created by the water pressure and flow, which could exceed the holding capacity of the replaceable cartridge mounting tab 15. To ensure the replaceable chemical cartridge 12 stays in place under water pressure and flow, distances and clearances are designed into the length of the replaceable chemical cartridge 12 and the base of the replaceable chemical cartridge 12, or, an optional cartridge mounting foot 16, to enable direct contact of the optional cartridge mounting foot 16 with the bottom floor surface 9' of the dispenser tank 9 to prevent the replaceable chemical cartridge 12 from moving and causing the cartridge inlet port sealing gasket 25 from becoming disengaged from the dispenser head receiving port 24.

Figure 3:
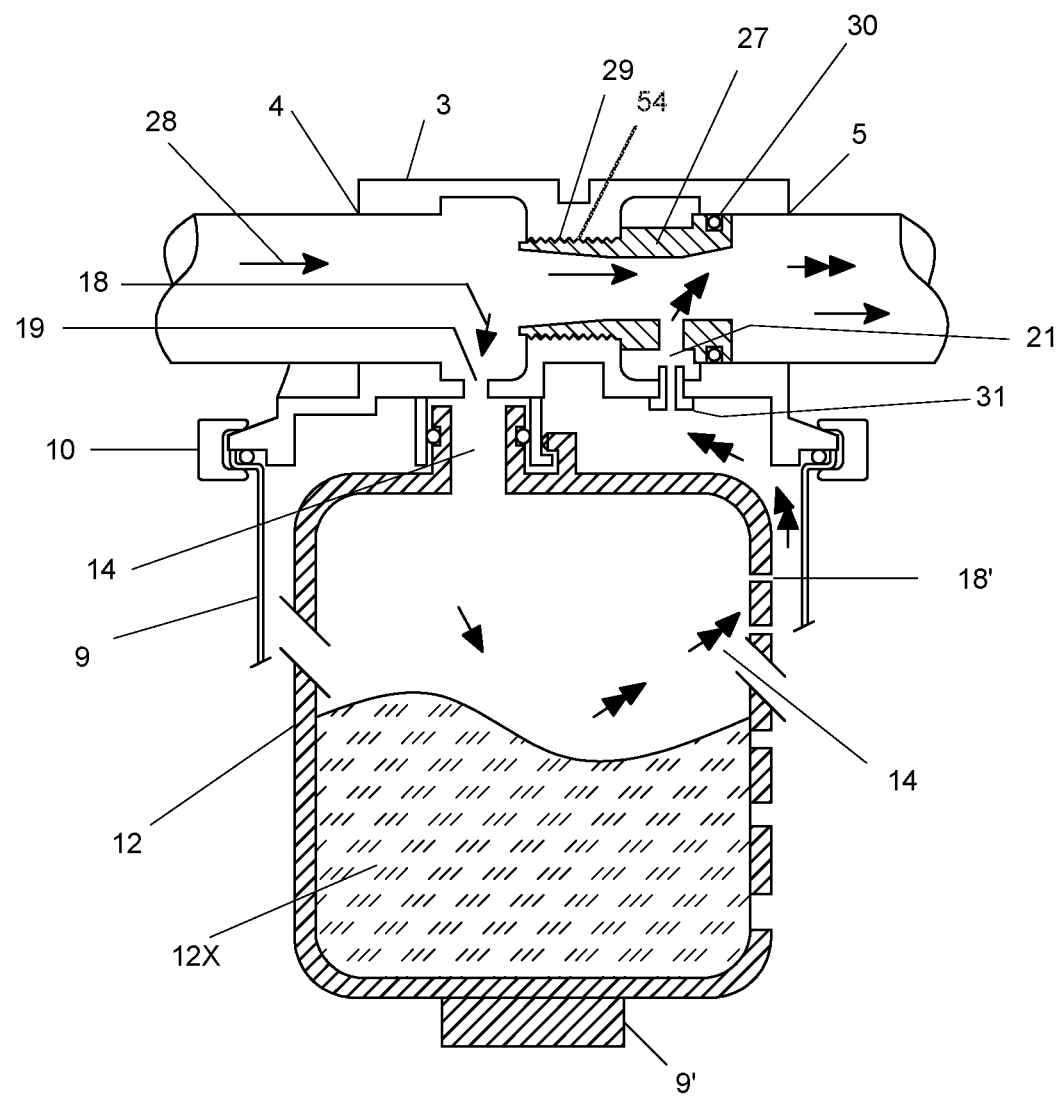
FIG. 3 provides a sectioned view showing the water flow pattern in a flow-through venturi type of configuration of the multifunctional dispensing dispenser.

FIG. 3 provides a sectioned view showing the water flow pattern in a flow-through venturi type of configuration of the multifunctional dispensing apparatus assembly 1. To better illustrate the desired embodiment options, FIG. 3 does not show the inlet ball valve 6, outlet ball valve 7, and the lower portion of dispenser tank 9, although it is understood these elements form part of the complete multifunction dispensing apparatus assembly 1.

As an application option for the multifunction dispensing apparatus assembly 1, FIG. 3 shows the inclusion of an adjustable and/or removeable venturi orifice 27. The function of the venturi orifice 27 is to produce a pressure differential, proportional to the velocity of mainstream flow 28, between the left-hand first port 4 and the outlet channel 21. This proportional pressure differential is what causes the bypass cartridge flow 18 to occur as the cartridge flow 18 is drawn through the cartridge outlet ports 14', 14", 14'", 14"", 14""" of the replaceable chemical cartridge 12 and out the right-hand second port 5.

In the embodiment shown, the venturi orifice 27 is removable, and thereby adjustable, by use of the head mid-section threads 29 formed along an interior surface of the dispenser head. The mid-section 54 of the head assembly 2, that is, the mid-section threads 29 to which the venturi orifice 27 is selectively secured to provide for an adjustable and/or removable mid-section 54 adds great versatility to this embodiment. However, it is appreciated the venturi orifice 27 could be machined directly into the dispenser head. In the case of using a removable venturi orifice 27, a venturi orifice seal 30 is an option for producing a seal between the outlet channel 21 and the right-hand second port 5.

As shown in FIG. 3, a preferred embodiment of the invention includes a removable feed rate adjustment orifice 31 in the outlet channel 21, to allow another means of regulating the rate of the cartridge flow 18 through the replaceable chemical cartridge 12. As described in other parts of this application, including the descriptions for FIG. 2 and FIG. 7, a principal means of regulating the cartridge flow 18 through the dispenser is the size, configuration, and placement of the cartridge outlet ports 14', 14", 14'", 14"", 14""".

Figure 4:
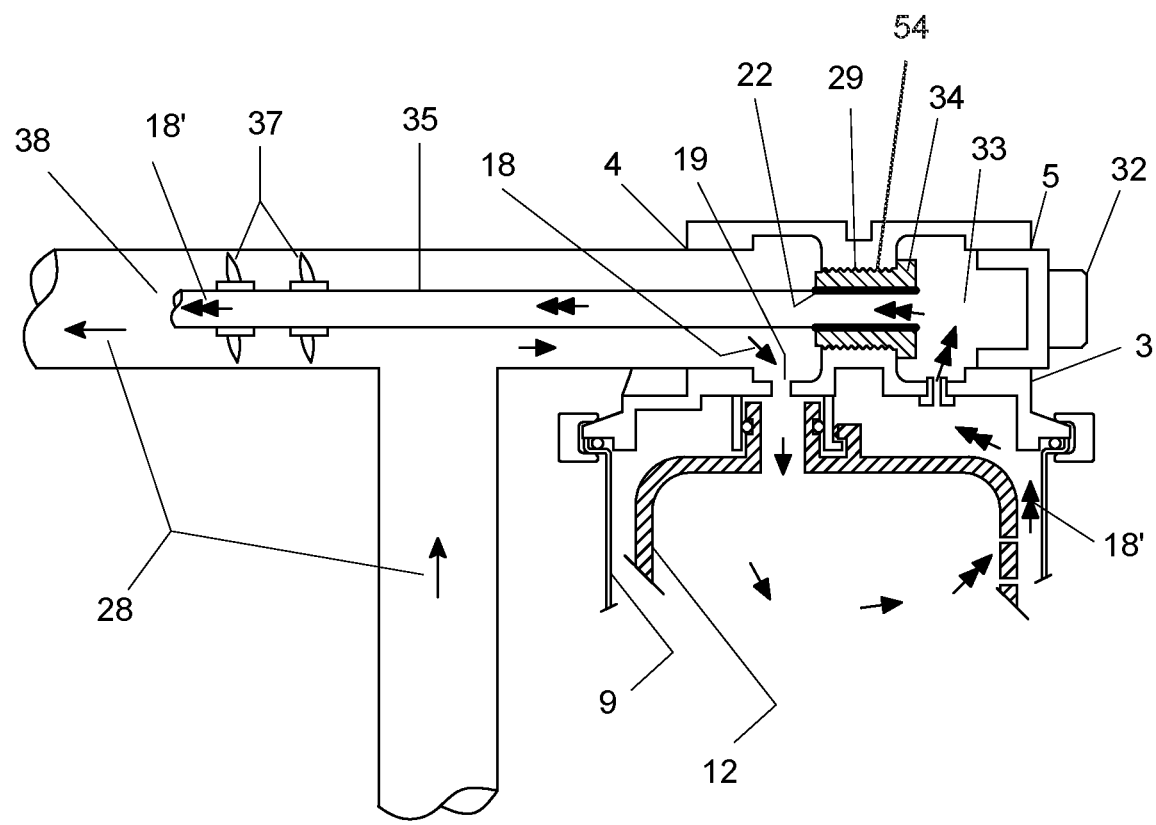
FIG. 4 provides a sectioned view of the multifunctional dispensing dispenser showing a dip-tube configuration. Also shown is the general embodiment of a downstream injection-tube assembly and flow modifier used to create a pressure differential between the right-hand and left-hand ports.

FIG. 4 provides a sectioned view of the multifunctional dispensing apparatus assembly 1 showing a dip-tube, or injection-tube, configuration installed at a 90-degree elbow in a piping system. It is noted that this type of installation could be installed at a tee in the piping, where the dip-tube is installed in the middle leg of the tee (not shown in the attached drawings).

For simplification of the illustration, FIG. 4 does not show the bottom portions of the dispenser tank 9 or the replaceable chemical cartridge 12 that are shown in FIG. 3.

In the embodiment shown in FIG. 4, a plug 32 is installed to seal or close the right-hand second port 5. The plug 32 is specifically sized to allow for a tool to engage components threaded to the head mid-section threads 29. The sealing or closing of the right-hand second port 5 creates an outlet space 33. In this preferred embodiment there is a threaded dip-tube, or tube, bushing 34 installed in the head mid-section threads 29. A long hollow dip-tube 35 is joined to the threaded dip-tube, or tube, bushing 34 by press fit or welding process, shown by heavy black line 36, to produce a continuous fluidic connection between the outlet space 33 and the mainstream flow 28. As with the prior embodiment, the mid-section 54 of the head assembly 2, that is, the mid-section threads 29 with the bushing 34 and dip-tube 35 selectively attached thereto, provides for an adjustable and/or removable mid-section 54 adding great versatility to this embodiment.

In the embodiment described in FIG. 4, when there is mainstream flow 28, due to the near static condition, or lower flow condition, the water pressure at the inlet channel 19 will be higher (lower velocity) than the higher velocity (lower pressure) water in the mainstream flow 28, in accordance with Bernoulli's laws of fluid dynamics. This magnitude of the pressure drop will be proportional to the mainstream flow 28, ranging from zero, at zero mainstream flow 28, to some maximum value and the highest mainstream flow. This pressure differential will cause a proportional rate of cartridge flow 18 through the replaceable chemical cartridge 12.

Further shown in FIG. 4 is an embodiment of the dip-tube 35 that includes flow modifiers 37 that supplement the desired pressure drop between the inlet channel 19 and the dip-tube outlet, or tube outlet, 38 caused by the mainstream flow 28. Configuration options of the flow modifiers 37 include single or multiple propellers or impellers (fixed or static), turbines, symmetrical and asymmetrical bells, plates, angled plates, spaced at specific intervals and rotated and specific angles to create desired velocity, turbulence, drag profiles, and mechanisms of constructive and destructive interference, to produce and improve the desired pressure drop between the inlet channel 19 and the dip-tube outlet, or tube outlet, 38 caused by the mainstream flow 28.

As described regarding the embodiment shown in FIG. 4, this type of installation could be installed at a tee in the piping, where the dip-tube is installed in the middle leg of the tee (not shown in the attached drawings).

Figure 5:
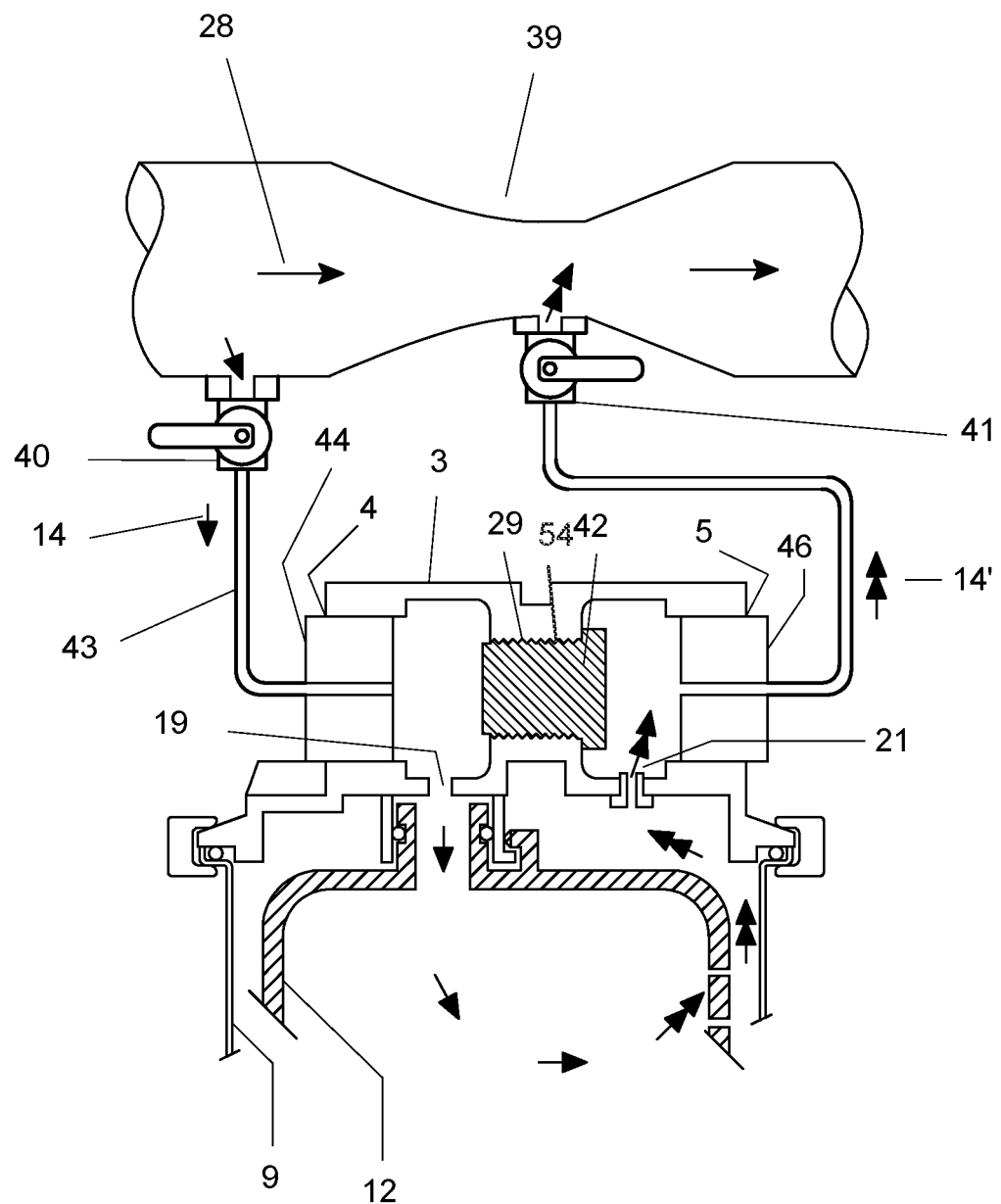
FIG. 5 shows a sectioned view of the multifunctional dispensing apparatus showing the mounting and sealing of replaceable chemical cartridge, and the water flow pattern for a third configuration of the multifunctional dispensing apparatus, including a remotely installed venturi designed to create a pressure differential between the right-hand and left-hand ports of said dispensing apparatus.

FIG. 5 shows a sectioned view of the multifunctional dispensing apparatus assembly 1 installed with a remotely installed traditional venturi 39 designed to create a pressure differential between the right-hand second port 5 and the left-hand first port 4 of the dispensing apparatus. A traditional venturi 39, configured with upstream venturi valve 40 and downstream Venturi valve 41, is a common method of producing a pressure differential to divert a proportional flow of water to a bypass type chemical feeder, however, there are many other methods to divert a proportional flow, including scooper type dip-tubes, pitot tubes, restriction valves, mechanically driven pumps, and electrical driven pumps used with and without flowmeters and pump-rate controllers.

For simplification of the illustration, FIG. 5 does not show the bottom portions of the dispenser tank 9 or the replaceable chemical cartridge 12 that are shown in FIG. 3.

In the embodiment shown in FIG. 5, a flow disrupting plug 42 is installed in the head mid-section threads 29 to force the cartridge flow 18, created by venturi 39, to pass through the replaceable chemical cartridge 12. The cartridge flow 18 occurs by tubing 43, 45 and tubing connectors 44, 46 that provide a watertight conduit between the venturi valves 40, 41 and the dispenser head 3. The mid-section 54 of the head assembly 2, that is, the mid-section threads 29 with the flow disrupting plug 42 selectively attached thereto, provides for an adjustable and/or removable mid-section 54 adding great versatility to this embodiment.

Figure 6:
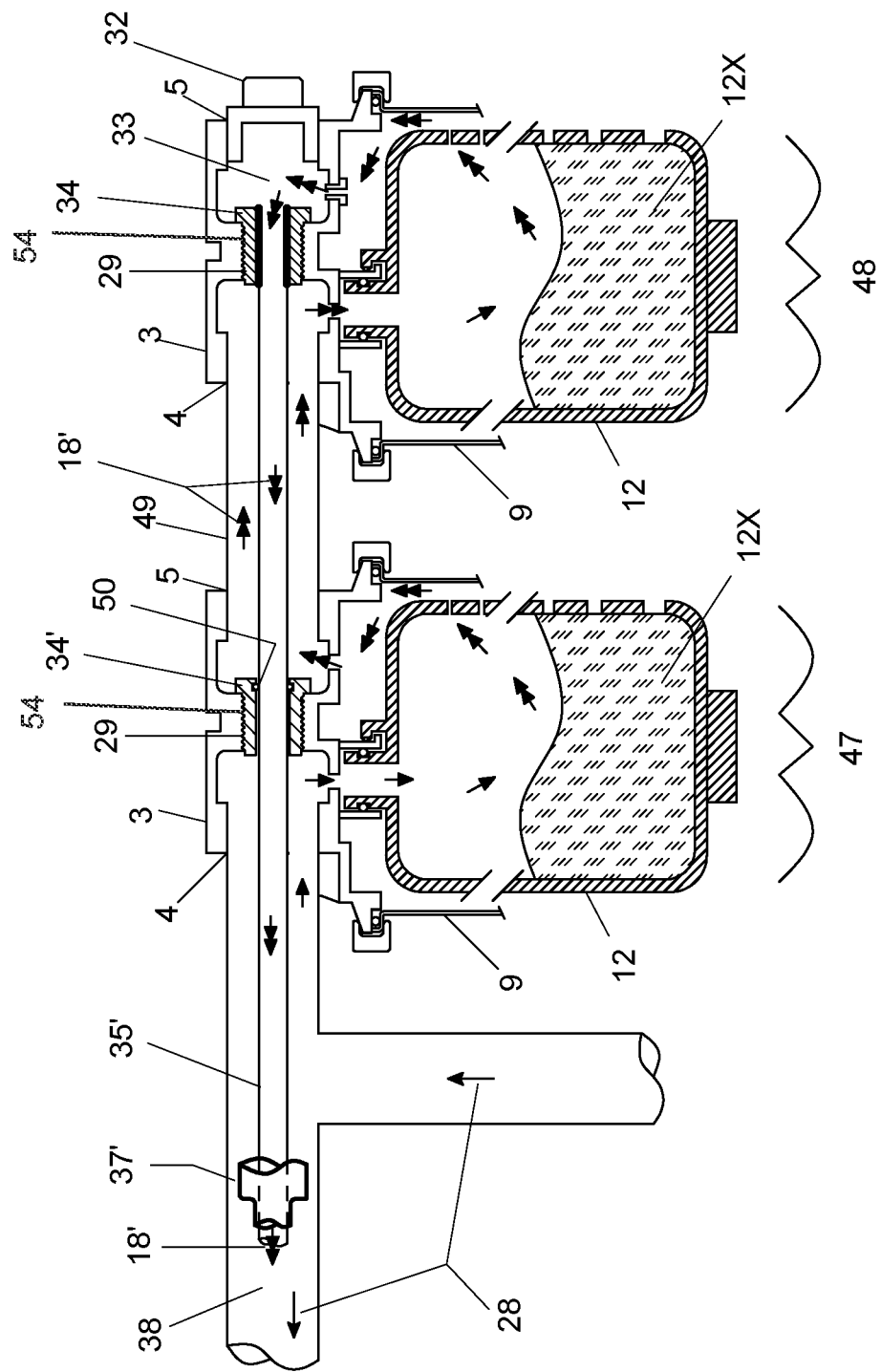
FIG. 6 shows a sectioned view of two multifunctional dispensing apparatus in a third configuration where multiple of said dispensing apparatus's can be joined, or daisy chained, together to increase the chemical capacity.

FIG. 6 shows a sectioned view of two multifunctional dispenser apparatus assemblies 1 in a third configuration where multiple of the dispensing apparatus's can be joined, or daisy-chained, together to increase the chemical capacity.

As shown in FIG. 6, a first daisy-chained multifunctional dispenser apparatus assembly 47 is installed according to the configuration described in FIG. 4, however, a second daisy-chained multifunctional dispenser apparatus assembly 48 is added, or daisy chained, together for the purpose of increasing the chemical product 12X capacity of the system. To install the second multifunctional dispenser apparatus assembly 48 a properly sized and length nipple 49 is just to make a junction between the right-hand second port 5 of the first multifunctional dispenser apparatus assembly 47 and the left-hand first port 4 of the second multifunctional dispenser apparatus assembly 48.

The dip-tube 35' shown in FIG. 6 is configured to be long enough to span between the two dispensers. There are various types of fittings that could be used to join the dip-tube 35' to each of the two dispensers, including the use of a dip-tube, or tube, bushing 34' with a non-binding seal 50 that allows for the assembly to be made in the field. The embodiment shown in FIG. 6 has a flow modifier 37' installed at the end of the dip-tube 35' to produce and enhance the desired pressure drop between the outlet space 33 and the dip-tube outlet, or tube outlet, 38 caused by the mainstream flow 28.

Figure 7A:
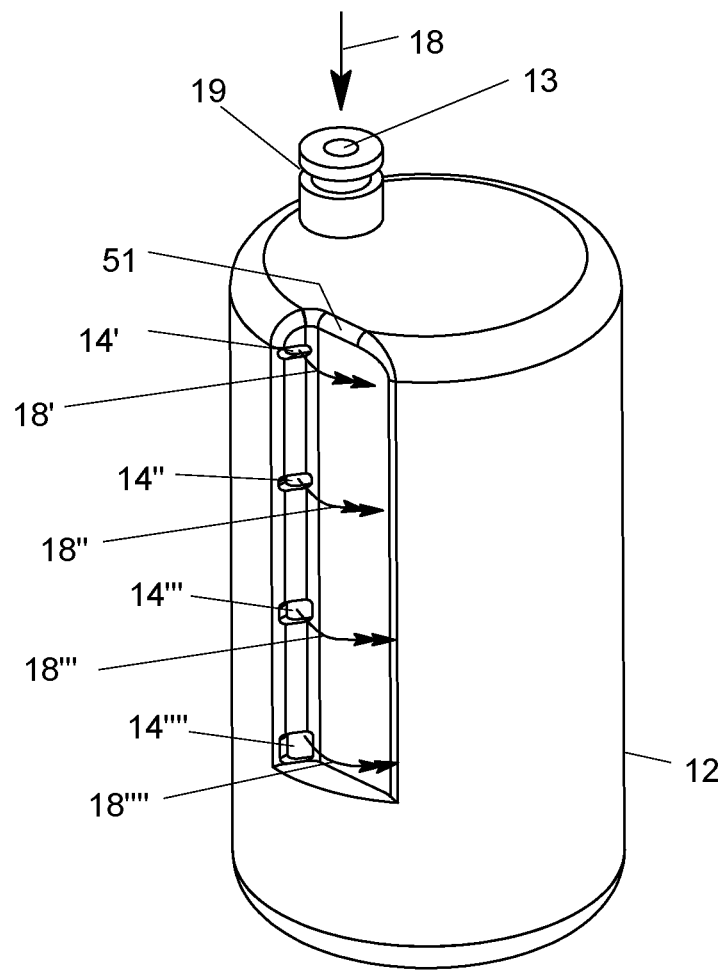
FIG. 7A shows an isometric view of the replaceable chemical cartridge, including the inlet port and the outlet ports that are configured to gradually meter out the chemical product relative to the flow rate.
Figure 7B:
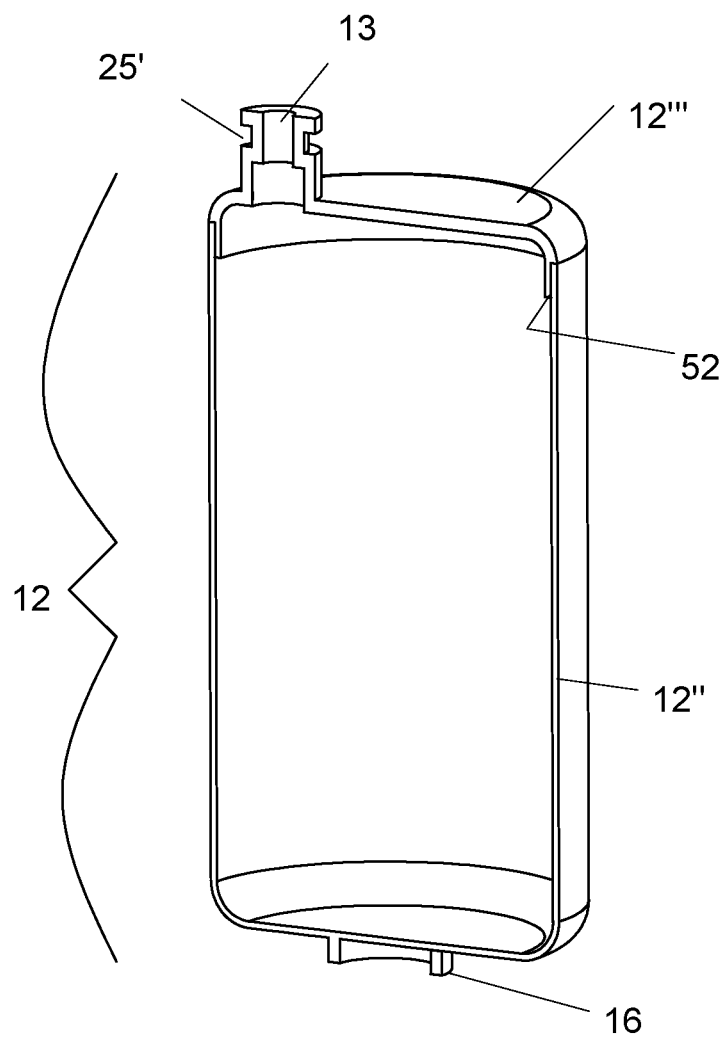
FIG. 7B shows an isometric view of a replaceable chemical cartridge without chemical product sectioned in half to show the internal features.
Figure 7C:
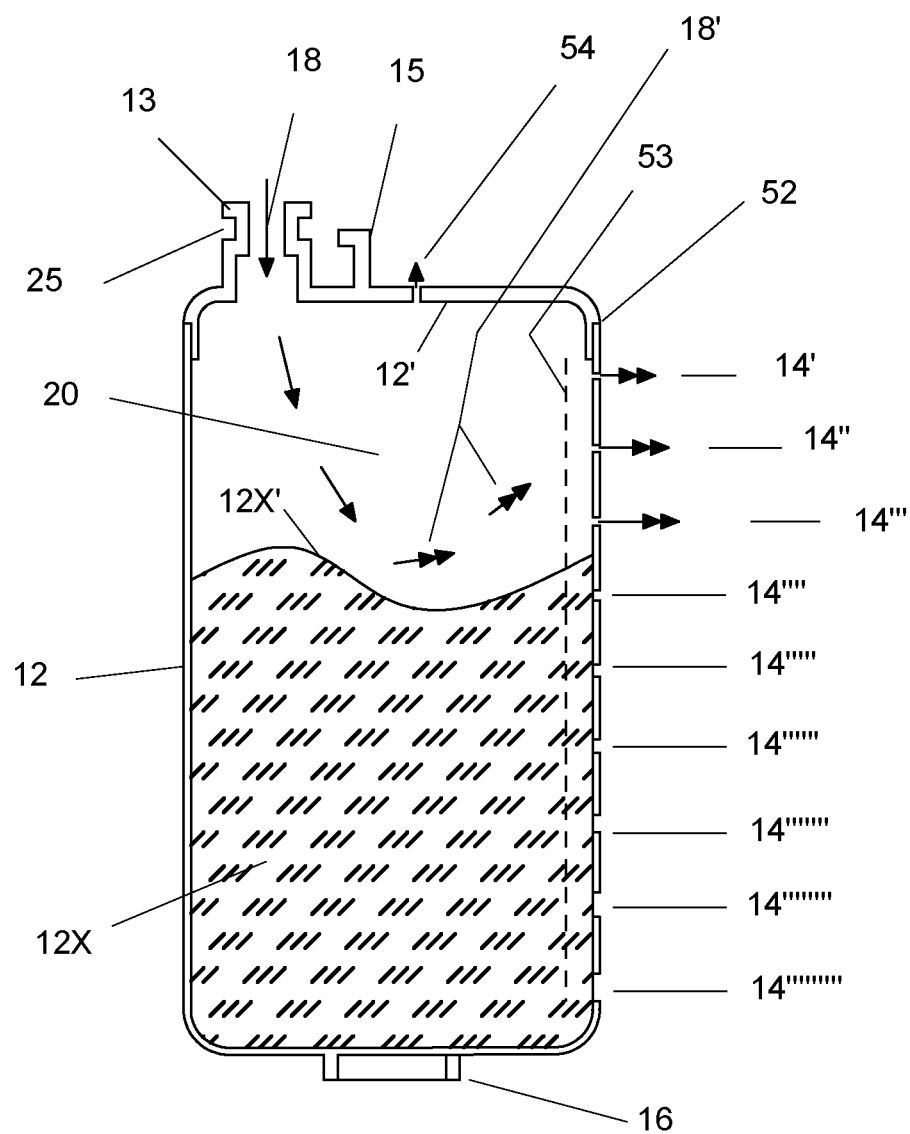
FIG. 7C shows a side view of a replaceable chemical cartridge with chemical product sectioned in half to show water flow through said cartridge, through said inlet port and outlet ports that are configured to gradually meter out the chemical product relative to the flow rate.

FIGS. 7A, 7B, and 7C show another embodiment. With reference to FIG. 7A an isometric view of the replaceable chemical cartridge 12, including the cartridge inlet port 13 and the cartridge outlet ports 14', 14", 14'", 14"" is shown. Not shown in FIG. 7A is the optional cartridge mounting foot 16, see FIG. 7B, or the cartridge mounting tab 15, see FIG. 7C.

As shown in FIG. 7A the replaceable chemical cartridge 12 provides for cartridge flow 18 that enters at the cartridge inlet port 13 located at the top of the cylinder-like replaceable chemical cartridge 12. The cartridge flow 18 enters the enters the cartridge space 20, not shown in FIG. 7A, see FIG. 7C. What is illustrated in FIG. 7A is the tangential exiting from the replaceable chemical cartridge of the semi-saturated cartridge flow 18', represented by double-ended solid arrow, which carries chemical product 12X, see FIG. 7C. As described in other parts of this application, including the descriptions for FIG. 2, a principal means of regulating the cartridge flow 18 through the dispenser is the size, configuration, and placement of the cartridge outlet ports 14', 14", 14'", 14"".

FIG. 7A only shows the cartridge outlet ports 14', 14", 14'", 14"" along a recessed indent 51 running down the longitudinal axis of the cylindrically shaped replaceable chemical cartridge 12. It is noted that this is for illustration purposes only, and there can be a large number of indentations, or indent configurations, and cartridge outlet ports 14 ranging from diameters of 1 mm, or smaller, to 10 mm, or larger. The cartridge outlet ports 14 can be of various shape configurations including round, oval, square, and rectangle, and can have directional attributes such as tangential, radial, up, or down. There can also be numerous recessed indents 51 running along the longitudinal axis, or laterally across, the cylindrically shaped replaceable chemical cartridge 12. The recessed indents 51 can have narrowing and widening aspect ratios along the vertical and horizontal axis of replaceable chemical cartridge 12, with the function of controlling the proper dissolution of the chemical product 12X, not shown in FIG. 7A, see FIG. 7C.

FIG. 7B shows an isometric view of the replaceable chemical cartridge 12, sectioned in half to show the internal configuration. The sectioning is done along the plane that results in the cartridge inlet port 13 being bisected into a perfect half, where also plainly shown is the inlet port sealing gasket groove 25'.

FIG. 7B shows a preferred mechanism for fabrication of the replaceable chemical cartridge 12, that is, as assembled elements secured together via a cartridge seam 52. In particular, the replaceable chemical cartridge 12 is made in two pieces, including a bottom cartridge portion 12'' and a top cartridge portion 12'''. The bottom cartridge portion 12'' is first filled with chemical product 12X (and a little water is commonly added to cause the chemical product to harden). The top cartridge portion 12''' is then positioned over the open top of the bottom cartridge portion 12'' and the connection is sealed by welding at the cartridge seam 52. It is noted that the cartridge seam could be located anywhere along the length, top or bottom, and in any orientation relative to the length or width of the replaceable chemical cartridge.

FIG. 7C shows a front view of a replaceable chemical cartridge 12 with chemical product 12X sectioned in half to show cartridge flow 18 through the cartridge inlet port 13 into the cartridge space 20. The cartridge space 20 is defined as the region between the internal upper surface 12' of the replaceable chemical cartridge 12 and the top 12X' of the solid soluble chemical product 12X. The cartridge flow 18 causes gradual dissolution of the soluble solid chemical product 12X, forming a semi-saturated cartridge flow 18', represented by double solid arrow, which carries chemical product 12X out the replaceable chemical cartridge 12 through a series of cartridge outlet ports 14', 14'', 14''', 14'''', 14''''', 14'''''', 14''''''', 14'''''''', 14'''''''''.

As illustrated in FIG. 7C, in this embodiment the cartridge outlet ports 14 are configured in a manner of specific size (cross-section of the opening), configuration (shape and direction), and placement down along the longitudinal axis of the replaceable chemical cartridge 12. The carefully determined placement of the cartridge outlet ports 14 is what allows the chemical product 12X to be accurately metered out to provide a reliable, consistent, and economical feed (consumption) of the chemical product 12X into the mainstream flow 28, see FIGS. 3, 4, and 5.

Using FIG. 7C to further illustrate the function of the carefully determined placement of the cartridge outlet ports 14, notice that there would be flow through cartridge outlet ports 14', 14'', and 14'''. However, because there is solid chemical product 12X covering cartridge outlet ports 14'''' through outlet ports 14''''''''', there would be no water flow through these ports. However, as the chemical product 12X is consumed, cartridge outlet ports 14'''' become uncovered and clear of the chemical product 12X and begins to flow, and then 14''''' becomes clear of the chemical product 12X and begins to flow, and so on and so forth, providing the necessary decrease in flow resistance to consume all of the chemical product 12X. With over thirty years of experience, we have discovered that the gradual decrease in for resistance is necessary to gradually increase the flow rate to reliably and consistently dissolve the entire cartridge of chemical product 12X.

As an aid to containing the chemical product 12X within the replaceable chemical cartridge 12, and to reliably and consistently dissolve the chemical product 12X, a screen layer 53 can be used to cover the cartridge output ports 14. In some cases, to initiate the cartridge flow 18 a pilot hole 54 may be recommended on the upper surface 12' of the replaceable chemical cartridge 12.

In compliance with the statute, the invention has been described in language specific to structural and/or methodical features. It is to be understood that the invention is not limited to specific features shown or described since the means herein described comprises preferred forms of putting the invention into effect. The invention may, therefore, be claimed in any of its forms or modifications within the proper scope of the description and claims appropriately interpreted by those skilled in the art.

The invention claimed is:

1. A multifunction dispensing apparatus, comprising:
a head assembly including a dispenser head, a first port, and a second port;
a tank to which the head assembly is secured; and
a replaceable chemical cartridge installed within the tank, the replaceable chemical cartridge being filled with a soluble chemical product, the replaceable chemical cartridge includes a cartridge inlet port to which the first port of the head assembly is connected, cartridge space defined as a region between an internal upper surface of the replaceable chemical cartridge and a top of the soluble chemical product, and a series of cartridge outlet ports positioned down along a longitudinal axis of the replaceable chemical cartridge in a manner regulating cartridge flow and producing a gradual dissolution of the soluble chemical product, the series of cartridge outlet ports being connected to the second port for permitting the outlet flow from the dispensing apparatus;
wherein cartridge flow, that is, flow of bypass water that is diverted into and through the replaceable chemical cartridge, enters via the first port, passing through an inlet channel of the first port, then into the cartridge inlet port, the cartridge flow then enters the cartridge space, the cartridge flow causing gradual dissolution of the soluble chemical product, forming a semi-saturated cartridge flow, which carries chemical product out the replaceable chemical cartridge through the series of cartridge outlet ports, after the semi-saturated cartridge flow exits the cartridge outlet ports, the flow continues up through an annulus space between the replaceable chemical cartridge and an outlet channel of the second port, then into an outlet space in the region of the second port.

2. The multifunction dispensing apparatus according to claim 1, wherein size, configuration, and placement of the cartridge outlet ports are configured to regulate the cartridge flow and produce a gradual dissolution of the soluble chemical product.

3. The multifunction dispensing apparatus according to claim 1, wherein the head assembly also includes an integrated inlet ball valve and an integrated outlet ball valve, wherein the integrated inlet ball valve and the integrated outlet ball valve permit "on" and "off" regulation of flow and pressure into the tank.

4. The multifunction dispensing apparatus according to claim 1, wherein the replaceable chemical cartridge is comprised of a cylindrical or semi-cylindrical body.

5. The multifunction dispensing apparatus according to claim 1, further including a plug sealing the second port and an injection-tube creating a continuous fluidic connection between the series of cartridge outlet ports and the second port, and a mainstream flow that creates a desired pressure drop between the first port and the second port.

6. The multifunction dispensing apparatus according to claim 5, wherein the injection-tube includes flow modifiers that supplement a desired pressure drop between the first port and the second port caused by mainstream flow.

7. The multifunction dispensing apparatus according to claim 1, wherein the cartridge outlet ports range from diameters of 1 mm, or smaller, to 10 mm, or larger.

8. The multifunction dispensing apparatus according to claim 1, further including a screen layer covering cartridge output ports.

9. A multifunction bypass dispensing apparatus, comprising:
a head assembly including a dispenser head, a first port, a second port, an integrated inlet ball valve, and an integrated outlet ball valve, wherein the integrated inlet ball valve and the integrated outlet ball valve permit "on" and "off" regulation of flow and pressure into a dispenser tank;
a tank to which the head assembly is secured; and
a replaceable chemical cartridge installed within the tank, the replaceable chemical cartridge being filled with a soluble chemical product, the replaceable chemical cartridge includes a cartridge inlet port to which the first port of the head assembly is connected and a series of cartridge outlet ports positioned down along a longitudinal axis of the replaceable chemical cartridge in a manner regulating cartridge flow and producing a gradual dissolution of the soluble chemical product, the series of cartridge outlet ports being connected to the second port for permitting the outlet flow from the dispensing apparatus.

10. The multifunction bypass dispensing apparatus according to claim 9, wherein the head assembly includes an access plug for tool and part access in the second port.

11. The multifunction bypass dispensing apparatus according to claim 10, further including a removable feed rate adjustment orifice.

12. A multifunction bypass dispensing apparatus, comprising:
a head assembly including a dispenser head, a first port, a second port, and a removable and/or adjustable mid-section;
a tank to which the head assembly is secured; and
a replaceable chemical cartridge installed within the tank, the replaceable chemical cartridge being filled with a solid soluble chemical product, the replaceable chemical cartridge includes a cartridge inlet port to which the first port of the head assembly is connected and a series of cartridge outlet ports positioned down along a longitudinal axis of the replaceable chemical cartridge in a manner regulating cartridge flow and producing a gradual dissolution of the soluble chemical product, the series of cartridge outlet ports being connected to the second port for permitting the outlet flow from the dispensing apparatus.

13. The multifunction bypass dispensing apparatus according to claim 12, wherein the mid-section includes a removeable and/or adjustable venturi orifice.

14. The multifunction bypass dispensing apparatus according to claim 12, wherein the mid-section includes mid-section threads.

15. The multifunction bypass dispensing apparatus according to claim 12, wherein the mid-section includes a flow disrupting plug.

16. The multifunction bypass dispensing apparatus according to claim 12, wherein the head assembly further includes an integrated inlet ball valve and an integrated outlet ball valve, wherein the integrated inlet ball valve and the integrated outlet ball valve permit "on" and "off" regulation of flow and pressure into a dispenser tank.

17. The multifunction bypass dispensing apparatus according to claim 12, wherein the head assembly includes an access plug for tool and part access to make modifications to the mid-section.

18. The multifunction dispensing apparatus according to claim 12, further including a plug sealing the second port and an injection-tube creating a continuous fluidic connection between the and the series of cartridge outlet ports and the second port, and a mainstream flow that creates a desired pressure drop between the first port and the second port.

19. The multifunction dispensing apparatus according to claim 18, wherein the injection-tube includes flow modifiers that supplement a desired pressure drop between the first port and the second port caused by mainstream flow.

20. The multifunction bypass dispensing apparatus according to claim 12, further including a second multifunctional dispenser apparatus assembly daisy-chained to the multifunctional dispenser apparatus assembly.

21. A multifunction bypass dispensing apparatus, comprising:
a head assembly including a dispenser head, a first port, a second port, an integrated inlet ball valve, and an integrated outlet ball valve, wherein the integrated inlet ball valve and the integrated outlet ball valve permit "on" and "off" regulation of flow and pressure into a dispenser tank;
a tank to which the head assembly is secured;
a replaceable chemical cartridge installed within the tank, the replaceable chemical cartridge being filled with a soluble chemical product, the replaceable chemical cartridge includes a cartridge inlet port, cartridge space defined as a region between an internal upper surface of the replaceable chemical cartridge and a top of the soluble chemical product, and a series of cartridge outlet ports positioned down along a longitudinal axis of the replaceable chemical cartridge in a manner regulating cartridge flow and producing a gradual dissolution of the soluble chemical product, the series of cartridge outlet ports being connected to the second port for permitting the outlet flow from the dispensing apparatus; and
a plug sealing the second port and an injection-tube creating a continuous fluidic connection between the series of cartridge outlet ports and the second port, and a mainstream flow that creates a desired pressure drop between the first port and the second port.

22. The multifunction dispensing apparatus according to claim 21, wherein the injection-tube includes flow modifiers that supplement a desired pressure drop between the first port and the second port caused by mainstream flow.

23. The multifunction bypass dispensing apparatus according to claim 21, wherein size, configuration, and placement of the cartridge outlet ports are configured to regulate the cartridge flow and produce a gradual dissolution of the soluble chemical product.

24. The multifunction bypass dispensing apparatus according to claim 21, wherein the cartridge outlet ports range from diameters of 1 mm to 10 mm.

25. The multifunction bypass dispensing apparatus according to claim 21, further including a screen layer covering cartridge output ports.

26. The multifunction bypass dispensing apparatus according to claim 21, wherein the head assembly includes an access plug for tool and part access in the second port.

* * * * *